(12) United States Patent
Hoffmann et al.

(10) Patent No.: US 6,805,037 B2
(45) Date of Patent: Oct. 19, 2004

(54) BRAKE BOOSTER SENSOR

(75) Inventors: Jan Hoffmann, Rochester Hills, MI (US); Craig R. Belevender, Clarkston, MI (US); Kevin M. Johnston, Rochester, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 57 days.

(21) Appl. No.: 10/281,939

(22) Filed: Oct. 28, 2002

(65) Prior Publication Data

US 2004/0079222 A1 Apr. 29, 2004

(51) Int. Cl.[7] ............................................... F04B 25/26
(52) U.S. Cl. ........................ 91/1; 91/369.2; 91/376 R
(58) Field of Search ......................... 91/1, 369.2, 376 R

(56) References Cited

U.S. PATENT DOCUMENTS

| | | | | |
|---|---|---|---|---|
| 4,633,757 A | * | 1/1987 | Kubota | 91/369.2 |
| 4,953,444 A | * | 9/1990 | Cunningham et al. | 91/1 |
| 5,350,224 A | * | 9/1994 | Nell et al. | 91/376 R |
| 5,427,442 A | * | 6/1995 | Heibel | 303/114.3 |
| 5,658,055 A | * | 8/1997 | Dieringer et al. | 303/114.3 |
| 6,253,656 B1 | * | 7/2001 | Gilles | 91/367 |
| RE37,841 E | * | 9/2002 | Schluter et al. | 91/369.4 |

* cited by examiner

Primary Examiner—Edward K. Look
Assistant Examiner—Igor Kershteyn

(57) ABSTRACT

The present invention provides a single sensor, preferably of a capacitance type, that detects various conditions of a brake booster and the braking system. In one embodiment, the sensor is integrally formed with a reaction disc in the brake booster. Another embodiment includes forming the sensor within the poppet valve of the brake booster.

20 Claims, 3 Drawing Sheets

BRAKE BOOSTER SENSOR

FIELD OF THE INVENTION

The present invention relates generally to brake boosters, and more particularly relates to a multi-purpose sensor for a brake booster.

BACKGROUND OF THE INVENTION

Most modern vehicles employ power brakes utilizing a brake booster. The brake booster uses a vacuum to multiply the force that a driver applies to the brake pedal. Briefly, the engine intake manifold provides a vacuum source to suck air out of the booster, producing a partial vacuum. Alternately, a separate vacuum pump can be utilized for this function. At least one diaphragm is positioned within the booster to define first and second chambers. When the brake pedal is undepressed, both the first and second chambers are at the low pressure of the partial vacuum.

When the brake pedal is depressed, a valve is opened allowing atmospheric air to enter the booster on one side of the diaphragm. This increases the pressure on that side of the diaphragm, say the second chamber for example, which assists in pushing the output rod, and in turn the piston in the master cylinder of the braking system. When the brake pedal is released, the valve seals off the outside air supply while reopening the vacuum to the second chamber. With the partial vacuum restored in both the first and second chambers, pressure on the diaphragm is equal and the system returns to its original position.

A number of different sensors and switches are utilized within the braking system and the brake booster which serve many different purposes. For example, within the braking system a pressure sensor is typically employed to detect the pressure of the braking fluid at the master cylinder. Among other things, the pressure sensor can detect when the driver applies the brakes while in a brake assist mode, i.e. when the electronic stability program utilizes the solenoid to apply force to the output rod and pressurize the master cylinder. Additionally, a brake light switch is typically employed for detecting when the brake is applied and causing the vehicle brake lights to be energized.

Within the booster, a displacement transducer, commonly referred to as a $\Delta S$ sensor is utilized to detect the position of a first force transmitting member operatively connected to the brake pedal, relative to a second force transmitting member operatively connected to the diaphragm of the booster. Among other things, the $\Delta S$ sensor can detect a failed boost situation, i.e. where the second chamber does not readily fill with atmospheric air to move the second force transmitting member forward into alignment with the first member. Further, a micro switch is typically used to determine whether or not the driver is pushing on the brake pedal. A travel sensor is typically employed to determine the position and rate of movement of the diaphragm relative to the outer casing of the booster. Accordingly, the travel sensor can detect whether the booster is active or not, and is primarily used to detect a panic brake situation. A panic brake situation occurs when the driver suddenly and quickly applies the brakes, which can be detected by the position and rate of movement of the diaphragm.

Unfortunately, while all of these sensors are important, they can be rather expensive and increase the overall cost of the braking system and the vehicle. Further, installation of these sensors can sometimes be difficult, and may require additional work or testing to ensure their operability. For example, brake lights switches are typically installed at the original equipment manufacturer's assembly plant, and in some cases requires manual adjustments for proper performance. Accordingly, there exists a need for a simple, easy to install, and low cost alternative to the numerous and complex sensors currently used on braking systems and brake boosters.

BRIEF SUMMARY OF THE INVENTION

The present invention provides a single sensor which can replace many if not all of the sensors noted above. The information retrieved from the sensor may also be employed in other applications. The sensor is preferably a capacitance-type sensor that detects the location and force applied to the sensor. In one embodiment, the sensor is integrally formed within a reaction disc in the brake booster. The reaction disc is coupled to the output rod which is linked to the master cylinder. The reaction disc receives forces from the brake pedal via a valve piston assembly, and also receives forces from a transfer member connected to the diaphragm of the brake booster.

Another embodiment includes forming the sensor within the poppet valve of the brake booster. The poppet valve engages both the valve piston assembly and a control housing assembly connected to the diaphragm. The relative positions of the poppet valve, valve piston assembly, and control housing determines various states of the booster, and hence, a plurality of sensors can be replaced with the single sensor of the present invention.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
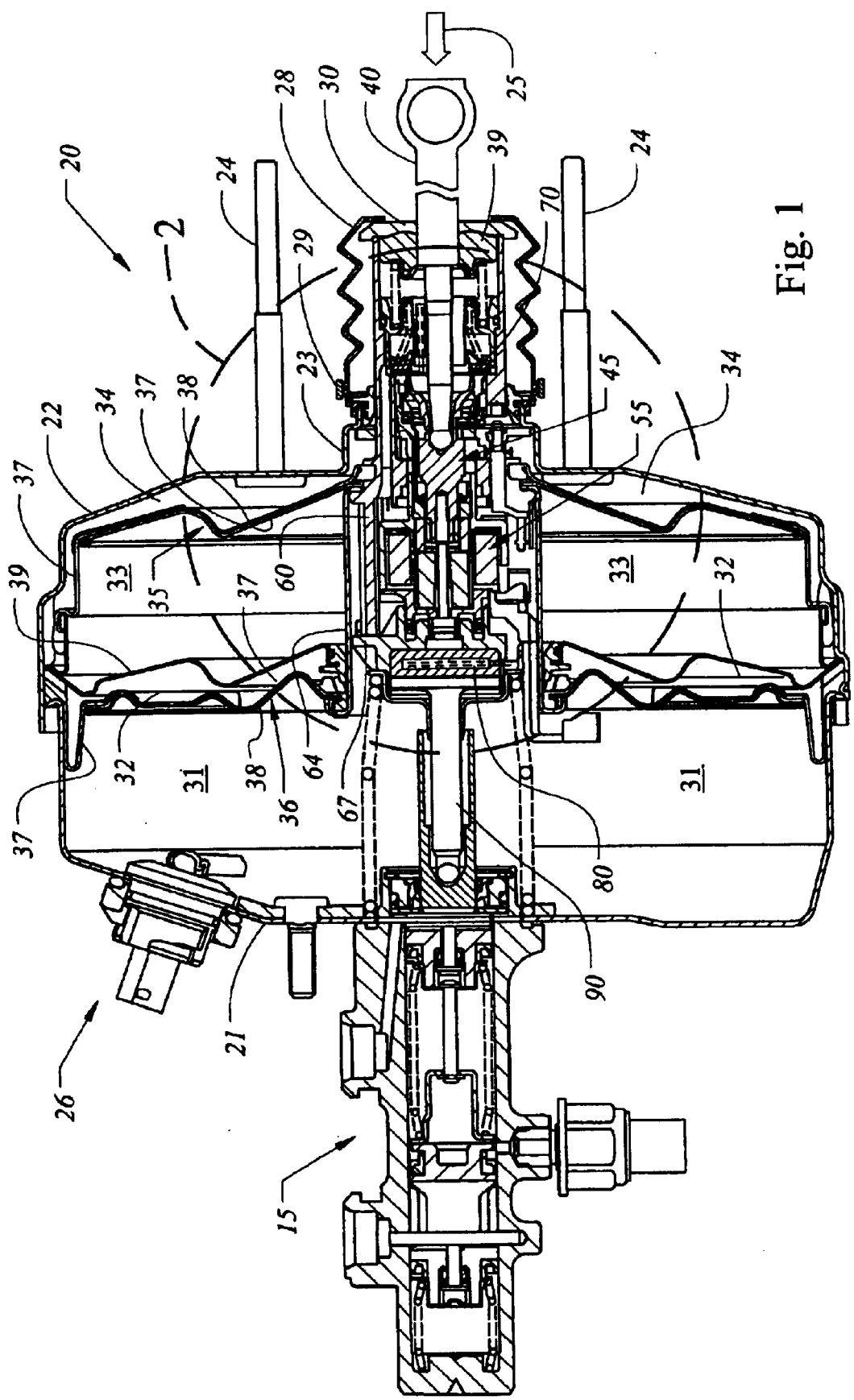
FIG. 1 is a cross-sectional view of a brake booster constructed in accordance with the teachings of the present invention, shown attached to a master cylinder.

With reference to FIG. 1, a brake booster 20 has been illustrated. The booster 20 generally includes an outer casing or housing 22 suitably fastened within the vehicle, typically by way of threaded fasteners 24. A check valve 26 is attached to the outer housing 22 and operates as a one-way valve linking the vacuum source (not shown) to the interior of the housing 22. A downstream end 21 of the booster is connected to the master cylinder 15 which operates the brakes of the braking system. An upstream end 23 of the booster is connected to an input rod 40, which in turn is connected to the brake pedal system (not shown). The brake pedal system applies a force shown by arrow 25 on the input rod 40, which ultimately is transferred to the fluid in the master cylinder 15.

The upstream end 23 of the housing 22 is a rubber dust boot 28 extending upstream to a seal plate 30 which includes an aperture for receiving the input rod 40. The dust boot 28 includes a filtered opening 29 for allowing atmospheric air into the booster 20. Air flows through the opening 29 and around the upstream end through filter 39 located adjacent seal plate 30. Air flows downstream a short distance to a poppet valve 70 which prevent atmospheric air from further entering the booster 20.

Figure 3:
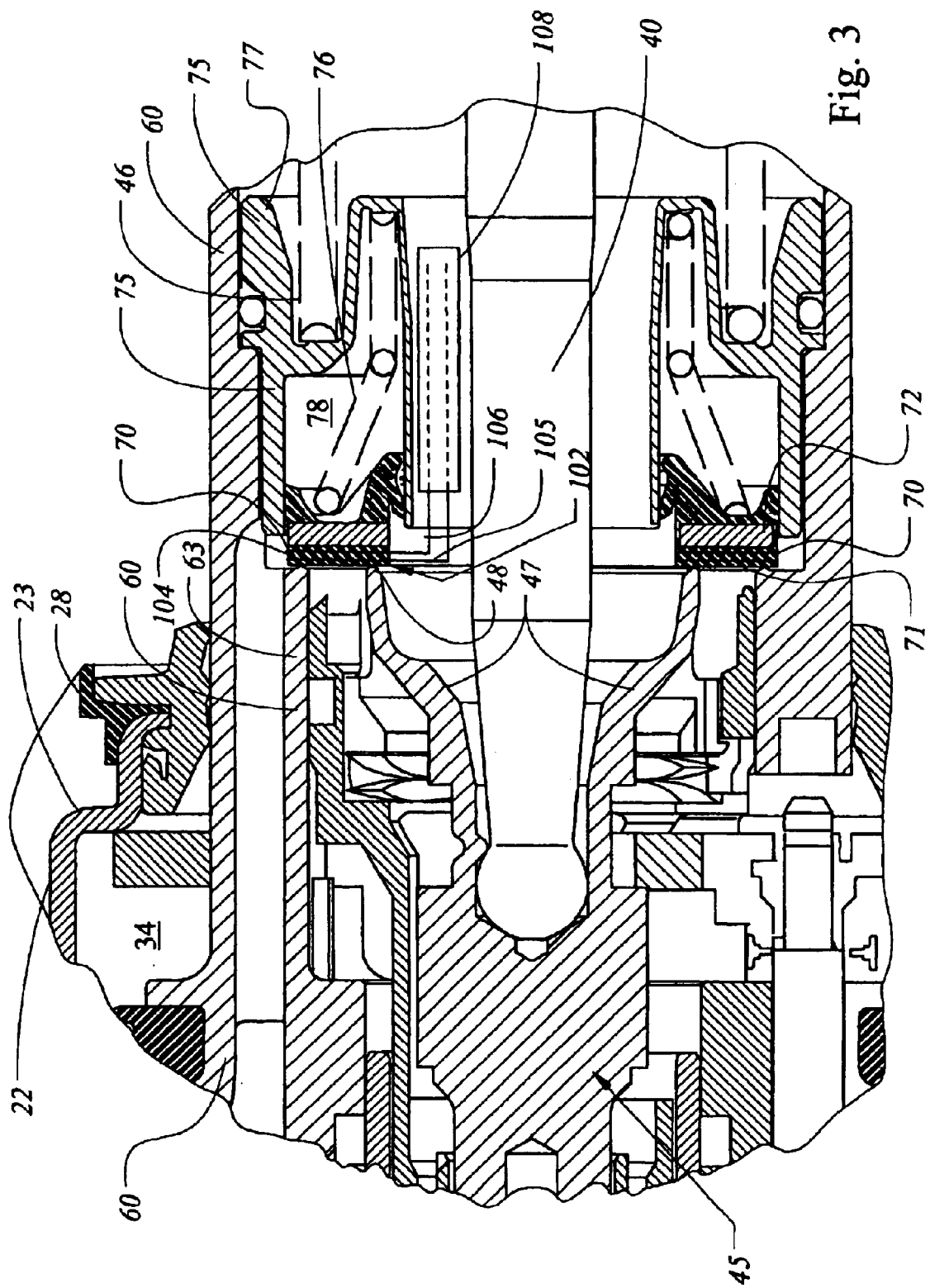
FIG. 3 is an enlarged view, partially cut away, of FIG. 1 showing another embodiment of the present invention.

The poppet valve 70 is rubber gasket that is slidably disposed within a chamber 78 formed in a spring clip 75 (FIG. 3). The poppet 70 includes a sealing face 71 which selectively engages both the piston assembly 45 and a control housing 60. A spring 76 positioned within the spring clip 75 biases the poppet valve forwardly so that it remains in engagement with either the valve piston assembly 45 or the control housing 60. The relative positions of the poppet 70, the piston assembly 45 and the control housing 60 regulates the flow of atmospheric air in and out of the booster 20, and hence the amount of "boost" force.

Figure 2:
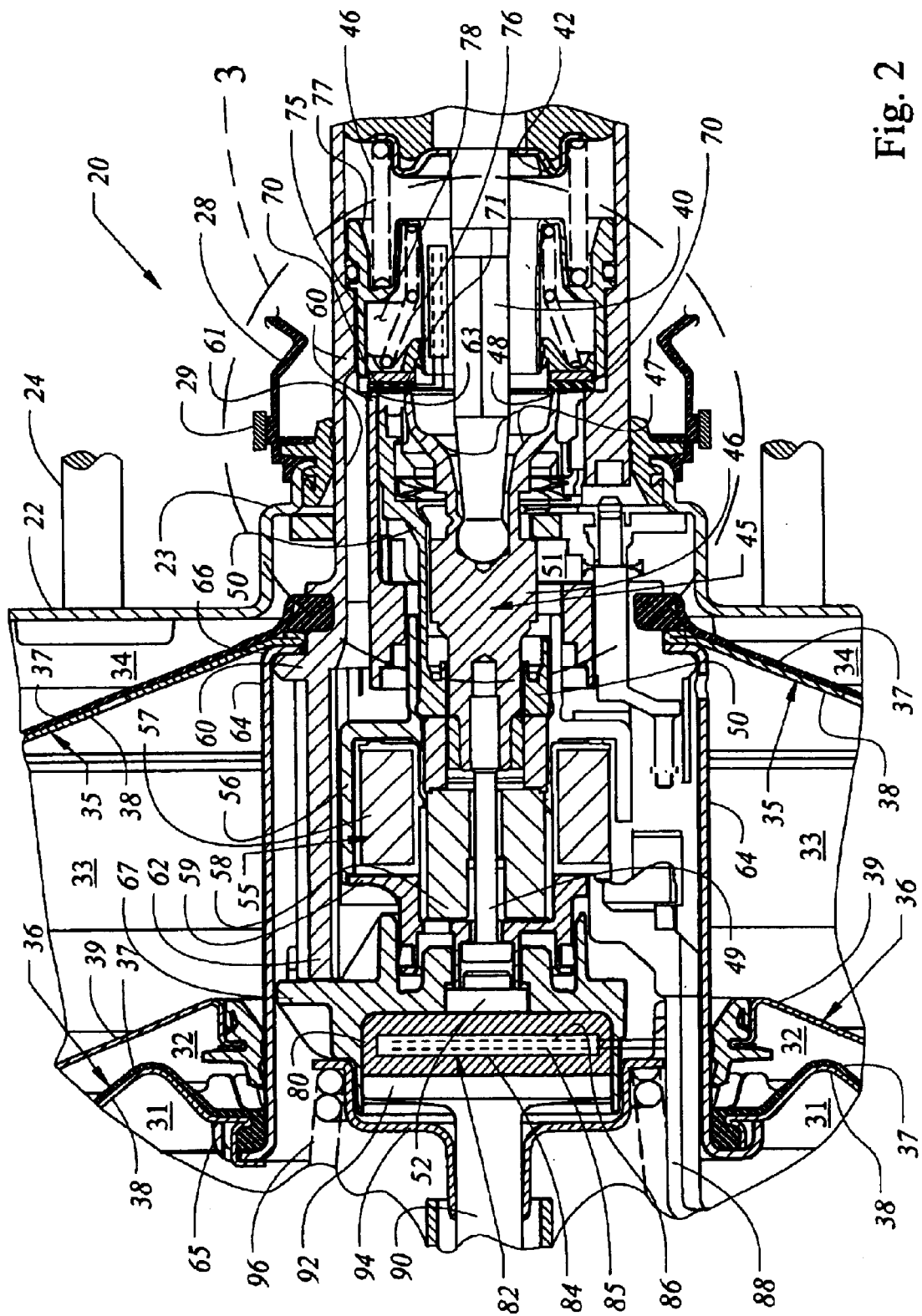
FIG. 2 is an enlarged view, partially cut away, of FIG. 1 showing one embodiment of the present invention.

As will be described in more detail herein, forces from both the brake pedal and the booster are transmitted through a reaction disc 80 to an output rod 90, which in turn is connected to the master cylinder 15. Forces from the brake pedal are transmitted through a valve piston assembly 45, as best seen in FIG. 2. The valve piston assembly 45 includes a piston body 46 attached directly to the input rod 40. A rear portion of the piston 46 includes a conical structure 47 which is hollow for receiving the input rod 40. The cone portion 47 also provides a distal end 48 which sealingly engages with the poppet valve 70 on surface 71. Surrounding the piston 46 is a sleeve member 50 which also extends rearwardly to circumscribe the cone portion 47 of the piston 46. As shown, the sleeve 50 does not contact the poppet valve 70, but does define a passage 51 between the piston 46 and the sleeve 50.

The valve piston assembly 45 also includes a solenoid assembly 55 which allows for electrical control over the braking system. Specifically, a solenoid housing 56 is attached to the sleeve 50 which is in turn connected to the piston body 46. The housing 56 encases a coil assembly 57, which when excited drives an armature 58, as is known in the art. An end cap 59 is attached to a downstream end of the housing 56 and extends rearwardly therefrom. A rearward end of the end cap 59 engages a thrust washer 52, which in turn engages the reaction disc 80 for transmitting force directly from the input rod 40 through to the output rod 90. A connection rod 49 links the end cap 59 directly to the piston 46 for moving the valve piston assembly 45 rearwardly when the brake pedal is released and the input rod 40 moves rearwardly. The connection rod 49 does not directly contact the thrust washer 52, and hence does not directly transmit force from the input rod 40 to the reaction disc 80 and output rod 90.

A control housing 60 circumscribes the valve piston assembly 45. The control housing 60 is utilized, in part, to transmit force from the diaphragms 35, 36 of the booster 20 to the reaction disc 80 and output rod 90. As best seen in FIG. 1, the inner volume of the booster 20 is defined by casing 22, and is divided into several chambers denoted by numerals 31, 32, 33, 34 moving from left to right in the figure. A metal divider 39 divides the inner volume in two, and a diaphragm 36 divides one of those volumes into a first chamber 31 and a second chamber 32, while another diaphragm 35 separates the other volume into a third chamber 33 and a fourth chamber 34. It will be recognized that only a single diaphragm forming two chambers may be employed. Basically, all of the chambers 31, 32, 33, 34 are subject to a vacuum pressure when the booster 20 is in its natural state. When the brake pedal is depressed, the chambers 32 and 34 are supplied with atmospheric air which is at a higher pressure than chambers 31 and 33, forcing the diaphragms 35, 36 to move forwardly (to the left in FIG. 1), creating a boost force. The diaphragms 35, 36 are each formed of a rubber sheet 37, which is supported on a downstream side by a metal sheet 38 shaped to correspond with the rubber sheet 37 (FIG. 2).

As best seen in FIG. 2, an inner end of the diaphragms 35, 36 is attached to the control housing 60 for transmitting the boost force. A radially inward end of the diaphragm 35 is sealingly attached directly to the control housing 60 as shown in the figures. The radially inward end of the second diaphragm 36 is sealingly and fixedly attached to one end 65 of an inner tube 64. The opposing end 66 of the inner tube 64 is attached to the control housing 60 adjacent the position where the inner end of the first diaphragm 35 is attached. A downstream end 62 of the control housing 60 abuts against a transfer plate 67 which in turn is engaged with the reaction disc 80. In this way, the boost force is transmitted to the output rod 90.

In summary, force from the brake pedal is directly transmitted through the input rod 40, the valve piston assembly 45, and the thrust washer 52 to the reaction disc 80 and the output rod 90. The boost force from the diaphragms 35, 36 is transmitted through the control housing 60 to the transfer plate 76 and hence the reaction disc 80 and output rod 90. It can thus be seen that the ratio of the area of contact with the reaction disc 80 between the transfer plate 67 and the thrust washer 52 determines the amount of gain obtained by the booster 20.

Operation of the booster will be briefly described. When the brake pedal is depressed, the input rod 40 moves forwardly (to the left in the figures) and moves the valve piston assembly 45, and more particularly the cone portion 47 and its end 48, off of the poppet valve 70. This allows atmospheric air to further enter the booster through passageway 51, and into chambers 32 and 34. As the pressure in chambers 32, 34 increases, the force on the diaphragms 35, 36 increases and they move forwardly. Accordingly, the inner tube 64 and control housing 60 move forwardly, pressing the transfer plate 67 against the reaction disc 80. At the same time, the poppet valve 70 moves forwardly with the control housing 60 biased in engagement with the end 63 against which it is sealed. Thus, the poppet 70 will ultimately seal against both ends 48 and 63 of the valve piston assembly 45 and control housing 60, respectively.

In this partial-brake state, the chambers 32, 34 are pressurized and a boosting force is provided through the control housing 60 and transfer plate 67, while braking pressure is also directly transmitted through the valve piston assembly 45 and thrust washer 52. When the brake is fully depressed, the valve piston assembly 45 moves forward and remains out of contact with the poppet valve 70 to fully pressurize the chambers 32, 34, while the thrust washer 52 continues to press into the reaction disc 80. When the brake pedal is released, the valve piston 46 moves rearwardly against the poppet valve 70. As the chambers 32, 34 are still pressurized, the control housing 60 generally remains in place. Thus, the piston assembly 45 presses the poppet valve 70 rearwardly against the spring 76, breaking the seal between the control housing 60 and the poppet valve 70. Accordingly, the vacuum source is allowed to suck air out of the chambers 32, 34 via passage 61 formed in the control housing 60. As pressure in the chambers 32, 34 is reduced, the control housing 60 moves rearwardly until it again engages the poppet 70. At this point, equilibrium is once again reached; both the valve piston assembly 45 and control housing 60 being in engagement with the poppet valve 70, and the chambers 31, 32, 33, 34 being subjected to a partial vacuum.

It can also be seen in FIGS. 1 and 2 that a spring clip 42 is fitted against the filter 39 at the upstream end of the booster 20, and a spring 46 extends between the clip 42 and the opposing spring clip 75. Spring clip 75 includes a recess 77 on its rear or upstream end for receiving the spring 46. Similarly, the spring clip 75 includes the spring 76 fitted within the interior chamber 78, in which the poppet valve 70 is fitted. Finally, a spring 96 is fitted against a support plate 94 at the downstream end of the housing 22. These three springs 46, 76, 96 are all selected with a force to balance the various mechanisms, namely the valve piston assembly 45, the control housing 60 and the poppet valve 70, in the booster's neutral state.

In accordance with the present invention, a single sensor is provided which can be used to replace many of the sensors currently used on the brake booster and the braking system. Preferably, a capacitance type sensor is integrated into the reaction disc 80. As best seen in FIG. 2, a sensor 82 includes a body 84 which is constructed of a polymer, preferably a rubber or plastic material, or a combination thereof. The body 84 includes at least one conductive element, and preferably two conductive elements formed therein. As shown in the figures, wires 85 and 86 have been formed within the body 84 and extend along its length. The wires 85, 86 have been fed through the reaction disc 80 and are connected to a conduit 88 for connection to an appropriate controller. Additional or different conductive elements may be used. The rubber body 84 is not required, and the rubber reaction disc 80 may itself be used as the body and the conductive elements 85, 86 may be integrally formed therein.

When a voltage is applied across the wires 85, 86, they have a capacitance therebetween which can accurately be measured. When a pressure is applied against the reaction disc 80 (such as from the control housing 60 and transfer plate 67, or from the valve piston assembly 45 through the thrust washer 52) the reaction disc 80 compresses, as does the body 84 of the sensor 82. A change in distance between the two conductive elements 85, 86 causes a change in capacitance, which can be measured by the controller. Based on the different readings of changing capacitance, not only can the amount of force applied to the reaction disc 80 be determined, the position where the force was applied can also be determined. Thus, the sensor 82 can detect whether the thrust washer 52 or the transfer plate 67 are pressing against the reaction disc 80, or whether both are pressing against the disc 80, and in what proportions. It will also be recognized that several of these capacitance sensors may be embedded in the reaction disc to individually detect what structures are transmitting force.

It will therefore be seen by those skilled in the art that this capacitance sensor 82 can be utilized to detect the relative position of the valve piston assembly 45 verses the control housing 60. Thus, the ΔS sensor may be replaced by the sensor 82. Further, the sensor 82 can detect whether or not the driver is pressing on the pedal and is braking, and hence the micro switch may be replaced.

Still further, the brake light switch typically installed at the pedal may be replaced and the sensor 82 can be used as a switch for the brake lights. As noted above, the sensor 82 will detect depression of the brake pedal through the input rod 40 and valve piston assembly 45. It is also possible through modeling to detect the pressure of the braking fluid at the master cylinder. As the reaction disc 80 is pressed against the plate 92 of the output rod 90, the position of the output rod 90 is detected by the sensor 82. Thus, based on the pressure received from the thrust washer 52 (from the valve piston assembly 45) and the plate 67 (from the control housing 60), the pressure of the fluid within the master cylinder can be interpolated. The sensor 82 may also be utilized to detect the position of the control housing 60 by virtue of the pressure that is applied through transfer plate 67. In turn, this position of the control housing 60 also indicates the position of the diaphragms 35, 36, relative to the outer housing 22. Thus, the travel sensor which detects the position of the diaphragms 35, 36 relative to the housing 22 can be replaced, and through modeling the sensor 82 can be used to detect when a panic situation has occurred and to activate the electronic braking system and solenoid 55 accordingly.

Another embodiment of the invention has been shown in FIG. 3. A sensor 102 is employed that is similar to the sensor 82, in that both of the sensors are a capacitance type sensor. It will be recognized that both sensors 82, 102 have been shown in the cross-sectional view of FIG. 1, so that the reader will understand where each sensor is located within the entire booster 20. However, each sensor 82, 102 are suggested to be used individually, although both sensors could be used in conjunction if desired. The sensor 102 similarly utilizes at least one conductive element, shown as wires 105, 106 in FIG. 3. The sensor 102 is integrally formed with the poppet valve 70. More specifically, a poppet valve 70 includes a forward portion or body 104 which is constructed of a polymer such as rubber. The wires 105, 106 are integrally formed within the body 104 in a fixed spaced apart relationship. Typically, the poppet valve 70 includes a steel reinforcing ring 72, and hence the conductive elements 105, 106 are placed in the body portion 104 of the poppet valve 70 located behind the ring 72. The wires 105, 106 are fed through a cable guide 108 for connection to the appropriate controller. As with the previous sensor 82, the current sensor 102 could be formed with its own body (not shown) which is inserted within the body 104 of the poppet valve 70. The sensor 102 can detect not only the force applied against the poppet valve 70 by the valve piston assembly 45 and the control housing 60 (via their ends 48, 63, respectively) but can also detect which of these structures is applying the force, and in what proportion if both are applying force.

Accordingly, the sensor detects at least three states of the booster 20 including a first state where both the valve piston assembly 45 and the control housing 60 engage the poppet valve 70, a second state wherein the control housing 60 engages the poppet valve 70 and the valve piston assembly 45 disengages the poppet valve 70, and finally a third state wherein the valve piston assembly 45 engages the poppet valve 70 and the control housing 60 disengages the poppet valve 70. Each of these states reveals the different conditions of the booster 20.

With this sensor 102 formed in the poppet valve 70, the ΔS sensor can be replaced since the relative positions of the valve piston assembly 45 and the control housing 60 can be detected. More specifically, when only one of the valve piston assembly 45 and control housing 60 are pressing against the poppet valve 70, the force with which they press against the poppet valve is indicative of the separation of the two structures, and a distance can be interpolated through modeling. Also, by detecting the relative forces on the poppet valve 70, the sensor 102 can detect whether or not the driver is braking, and hence replace the micro switch. Similarly, the sensor may replace the brake light switch typically installed at the pedal. Finally, as the sensor 102 can detect, through modeling and interpolation, the position and rate of movement of the diaphragms 35, 36, the sensor can detect a panic brake situation.

Accordingly, the capacitance-type sensor of the present invention has potential to replace a number of different sensors, including the ΔS sensor, the micro switch, the brake light switch, the pressure sensor and the travel sensor. Furthermore, the sensor is easy to manufacture and can be integrally incorporated into existing structures of the brake booster 20, namely the reaction disc 80 or the poppet valve 70.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A brake booster for an automotive braking system having a brake pedal operable by a driver to actuate a master cylinder and apply a braking force, the booster comprising:
   a piston assembly operatively connected to said brake pedal for transmitting force therebetween;
   a diaphragm separating a first chamber and a second chamber,
   a control housing connected to the diaphragm;
   an output rod operatively connected to said master cylinder, the output rod receiving forces from the piston assembly and the control housing for applying said braking force; and
   a sensor positioned proximate both the piston assembly and the control housing, the sensor detecting when the piston assembly contacts the sensor and when the control housing contacts the sensor for detecting the relative positions of the piston assembly and control housing.

2. The booster of claim 1, wherein the sensor detects the amount of force with which the piston assembly or the control housing contacts the sensor.

3. The booster of claim 1, wherein the sensor is a capacitive-type sensor detecting the change in capacitance along a conductive element.

4. The booster of claim 3, wherein the sensor detects the location of the change in capacitance to determine whether the piston assembly, the control housing, or both the piston assembly and control housing are transmitting force to the sensor.

5. The booster of claim 3, wherein tie sensor is constructed of a polymeric material encasing two conductive elements in a spaced apart relationship.

6. The booster of claim 5, wherein the sensor detects changes in capacitance due to changes in spacing of the two conductive elements.

7. The booster of claim 1, wherein the sensor detects the proportion of force transmitted by the piston assembly relative to the force transmitted by the control housing.

8. The booster of claim 1, wherein the sensor is integrated into a poppet valve selectively engaging the piston assembly and the control housing to regulate the relative pressures in the first and second chambers.

9. The booster of claim 1, wherein the sensor is integrated into a reaction disc positioned between the piston assembly and the output rod, and between the control housing and the output rod.

10. A brake booster for an automotive braking system having a brake pedal operable by a driver to actuate a master cylinder end apply a braking force, the booster comprising:
    a piston assembly operatively connected to said brake pedal for transmitting force therebetween;
    an output rod operatively connected to said master cylinder, the output rod receiving forces from the piston assembly for applying said braking force;
    an elastomeric reaction disc interposed between the piston assembly and the output rod for transmitting forces from the piston assembly to the output rod; and
    the reaction disc including a sensor therein for detecting when the piston assembly presses against and compresses the reaction disc.

11. The booster of claim 10, wherein the sensor detects the amount of force with which the piston assembly contacts the reaction disc.

12. The booster of claim 10, wherein the sensor is a capacitive-type sensor detecting the change in capacitance along a conductive element.

13. The booster of claim 10, further comprising a diaphragm and a control housing connected to the diaphragm, the diaphragm separating a first chamber and a second chamber, the reaction disc being positioned between the control housing and the output rod for transmitting forces from the control housing to the output rod, the sensor detecting the control housing pressing against the reaction disc.

14. The booster of claim 13, wherein the sensor is a capacitive-type sensor detecting the change in capacitance along a conductive element, the sensor detecting the location of the change in capacitance to determine whether the piston assembly, the control housing, or both the piston assembly and control housing are transmitting force to the reaction disc.

15. The booster of claim 14, wherein the sensor detects the force transmitted by the piston assembly to the reaction disc relative to the force transmitted by the control housing to the reaction disc.

16. A brake booster for an automotive braking system having a brake pedal operable by a driver to actuate a master cylinder and apply a braking force, the booster comprising:
    a piston assembly operatively connected to said brake pedal for transmitting force therebetween;
    a diaphragm separating a first chamber and a second chamber;
    a control housing connected to the diaphragm;
    an output rod operatively connected to said master cylinder, the output rod receiving forces from the piston assembly and the control housing for applying said braking force; and
    a poppet valve positioned to selectively sealingly engage the piston assembly and the control housing, the poppet valve including a sensor therein for detecting when the piston assembly or when the control housing engage the poppet valve.

17. The booster of claim 16, wherein the sensor detects at least three states of the booster including:

a first state wherein both the piston assembly and the control housing engage the poppet valve, a second state wherein the control housing engages the poppet valve and the piston assembly disengages the poppet valve, and a third state wherein the piston assembly engages the poppet valve and the control housing disengages the poppet valve.

18. The booster of claim 17, wherein the sensor detects the force with which the piston assembly and/or the control housing engages the poppet valve.

19. The booster of claim 16, wherein the sensor is a capacitance sensor having conductive elements embedded in the poppet valve.

20. The booster of claim 19, wherein the sensor detects the position of the changes in capacitance along the length of the conductive elements to determine whether the piston assembly, the control housing or both the piston assembly and control housing are engaging the poppet valve.

* * * * *

UNITED STATES PATENT AND TRADEMARK OFFICE
CERTIFICATE OF CORRECTION

PATENT NO. : 6,805,037 B2
DATED : October 19, 2004
INVENTOR(S) : Jan Hoffmann et al.

It is certified that error appears in the above-identified patent and that said Letters Patent is hereby corrected as shown below:

Column 7,
Line 35, immediately after "chamber" delete "," and substitute -- ; -- in its place.
Line 59, after "wherein" delete "tie" and substitute -- the -- in its place.

Column 8,
Line 11, after "cylinder" delete "end" and substitute -- and -- in its place.

Signed and Sealed this

Twenty-second Day of February, 2005

JON W. DUDAS
*Director of the United States Patent and Trademark Office*